United States Patent [19]

Francis

[11] Patent Number: 4,459,840
[45] Date of Patent: Jul. 17, 1984

[54] ROLLING WOBBLE PRESS

[75] Inventor: John H. Francis, Charles Town, W. Va.

[73] Assignee: Frederick Manufacturing Company, Frederick, Md.

[21] Appl. No.: 426,874

[22] Filed: Sep. 29, 1982

[51] Int. Cl.³ .............................................. B21J 9/18
[52] U.S. Cl. ..................................... 72/452; 72/126; 72/406; 72/403; 100/292
[58] Field of Search ................... 72/452, 406, 67, 112, 72/126, 403; 29/243.53; 100/292

[56] References Cited

U.S. PATENT DOCUMENTS

| | | | |
|---|---|---|---|
| 1,677,722 | 7/1928 | Lowrie | 72/126 |
| 2,739,726 | 3/1956 | Bregen | 72/126 |
| 4,313,332 | 2/1982 | Penny et al. | 72/406 |

FOREIGN PATENT DOCUMENTS

| | | | |
|---|---|---|---|
| 417313 | 2/1974 | U.S.S.R. | 72/406 |
| 419281 | 3/1974 | U.S.S.R. | 72/406 |
| 517514 | 6/1976 | U.S.S.R. | 72/406 |

Primary Examiner—Daniel C. Crane
Assistant Examiner—David B. Jones
Attorney, Agent, or Firm—John R. Moses

[57] ABSTRACT

A rolling wobble press includes a planar surface which is perpendicular to a first axis and a cone which rolls on the planar surface as the cone revolves around the first axis. The axis around which the cone rotates as it rolls intersects the first axis at the same point that the first axis intersects the planar surface so that under ordinary circumstances, there is no slippage between the cone and the planar surface. The cone is driven by a drive shaft which is coaxial with the first axis. The drive shaft is connected to the cone via a crank having an arm oriented obliquely thereto in which arm the cone is rotatably journaled.

In accordance with one embodiment of the press, the press is used to drive a plurality of punches in a riveting machine.

4 Claims, 3 Drawing Figures

ROLLING WOBBLE PRESS

BACKGROUND OF THE INVENTION

1. Field of the Invention

The instant invention relates to presses for engaging workpieces, operating tools, and the like. More particularly, the instant invention relates to presses which have the capability of operating a plurality of work stations individually wherein a plurality of related operations, such as setting a plurality of rivets in a workpiece, can be performed sequentially so as to minimize the amount of force necessary to perform the entire operation.

2. Technical Considerations and Prior Art

In manufacturing operations, it is frequently necessary to perform a series of operations on a workpiece or workpieces which requires the application of mechanical force provided by a press. Exemplary of this type of operation is a riveting operation wherein a workpiece requires the insertion of a plurality of rivets. If all of the rivets are set simultaneously, the magnitude of the impulse necessary to set the rivets is considerably greater than the magnitude of each individual impulse required to set the rivets one at a time. Accordingly, wobble-type riveting machines have been developed, as exemplified by the machines disclosed in U.S. Pat. Nos. 3,675,461; 3,899,909; and 3,800,579.

Each of these patents disclose a riveting machine in which a plurality of tools in the form of punches are pressed sequentially by a wobble mechanism as the wobble mechanism is rotated. However, in each case the wobble mechanism includes components which slide relative to one another and, therefore, necessitate lubrication. In addition, these devices are relatively complex and expensive and require a relatively large amount of energy and force to operate.

While riveting mechanisms are one application of the instant invention, any operation which requires a press will suffer from the same deficiencies as the aforedescribed wobble-type rivet mechanisms. For example, U.S. Pat. No. 3,703,823 discloses an upsetting or forging machine with a wobble die. In this machine, however, the die performs a circular rocking motion without rotation, and thus the advantages of rotation are not available.

In view of the aforementioned considerations, there is need for an improvement in press mechanisms.

SUMMARY OF THE INVENTION

It is a feature of the instant invention to provide a new and improved press mechanism wherein one portion of the press mechanism rolls on another so as to minimize friction and to maximize the force available along the line of contact.

In view of the aforedescribed feature, the instant invention contemplates a press which is oriented about a first axis, which axis is generally perpendicular to a planar surface on which a cone rolls as the cone is revolved about the first axis. The axis around which the cone rotates as it rolls is oblique to the first axis and intersects the first axis at the same point that the first axis intersects the planar surface. Accordingly, the cone rotates in a direction opposite the direction of revolution and engages the first surface with progressive line contact.

In accordance with one embodiment of the invention, a plurality of punches is disposed in the first surface. The punches are individually engaged by the cone along the line of contact between the cone and planar surface as the cone rotates and revolves.

In accordance with a still more specific embodiment of the invention, the press is utilized to drive punches in a riveting operation.

DESCRIPTION OF THE PREFERRED EMBODIMENTS

Figure 1:
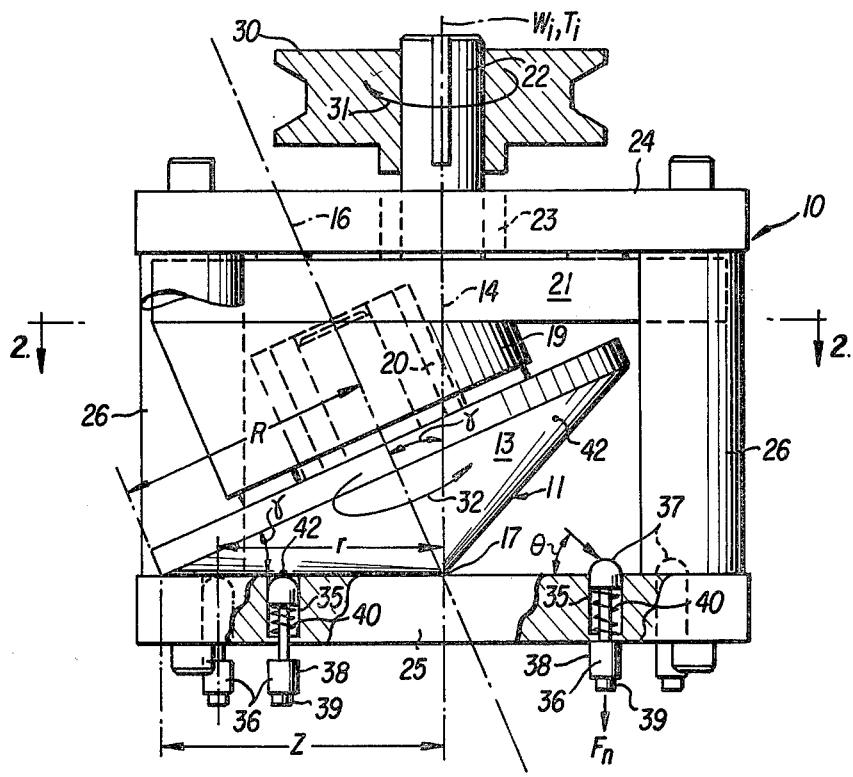
FIG. 1 is a side view of a press designed in accordance with the features of the instant invention.
Figure 2:
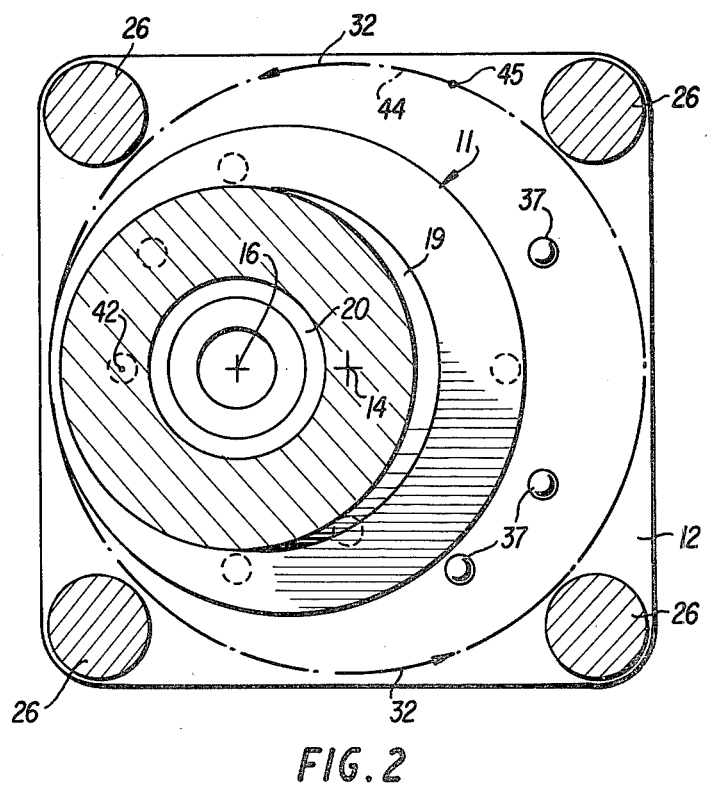
FIG. 2 is a top view taken along Line 2—2 of FIG. 1.

Referring now to FIG. 1, there is shown a press, designated generally by the numeral 10, configured in accordance with the principles of the instant invention wherein a cone, designated generally by the numeral 11, rolls on a planar surface, designated generally by the numeral 12, to perform a "pressing" operation between a conical surface 13 on the cone and the planar surface. A first axis 14 extends perpendicular to the planar surface 12 and defines an axis about which the cone 11 revolves as the conical surface 13 rolls on the planar surface 12. As the cone 11 rolls, it rotates about its axis 16 which intersects the first axis 14 at a point 17 which is the point that both axes intersect the plane of planar surface 12.

The cone 11 is mounted in a wobble arm 19 via roller bearings 20 so as to rotate about the axis 16. The wobble arm 19 is rigidly fixed to a disc 21 at an oblique angle. A drive shaft 22 is rigidly connected to the disc 21 to form a crank. The drive shaft 22 is journaled by bearings 23 to rotate in a first plate 24 about the first axis 14. The plate 24 extends perpendicular to the axis 14 and is connected to a second plate 25 (on which the planar surface 12 is defined) by rigid spacers 26 which maintain a parallel relationship between the plates 24 and 25.

The drive shaft 22 has a driving pulley, or perhaps a gear, 30 keyed thereto which transmits torque to the shaft 22. As the shaft 22 rotates in one direction, i.e., the direction of arrow 31, the cone 11 rotates in the opposite direction, i.e., the direction of the arrow 32, about the axis 16. Accordingly, the cone 11 revolves around the axis 14 as it rolls with progressive line contact over the planar surface 12 due to rotation about axis 16. Since the conical surface 13 rolls on the planar surface 12, there is only line contact therebetween and the friction between the surfaces is purely rolling friction. Accordingly, in the absence of excessive torque loads, none of the components slide relative to one another which negates the need for lubrication.

The cone 11 rotates about axis 16 at a rate which is substantially slower than the rate of rotation of the drive shaft 22. The speed reduction ratio is determined by the following relationship wherein R is a radius of the cone 11 with respect to the axis 16 about which the cone 11 rotates; z is the radius of the conical surface 13 taken perpendicularly with respect to the first axis 14 and $\gamma$ is the angle of inclination of the cone.

$$\text{The Speed Reduction Ratio} = \frac{R}{z - R};$$

However, since R=z cosγ, the Speed Reduction Ratio is also equal to $$\frac{\cos\gamma}{1 - \cos\gamma}.$$

Consequently, as γ decreases, the speed reduction ratio increases.

Because of the resultant relative rotation of cone surface 13 with respect to planar surface 12 due to the speed reduction, a reduced wear potential exists due to a line on surface 13 contacting the same line on planar surface 12 only once in a number of input rotations equal to the reduction ratio.

The configuration described thus far is particularly suitable as a press simply because any object which extends above the plane 12 can be subjected to a substantially enhanced mechanical force upon encountering the conical surface 13. One application for such a press is in driving a plurality of rivets to rivet workpieces. As is shown in FIG. 1, the plate 25 has a plurality of bores 35 therethrough. Mounted within the bores 35 are punches or tools, designated generally by the numeral 36, that have a rounded head portion 37, shank portin 38 and working surface 39. The punches 36 are normally biased by springs 40 so that the heads 37 project above the plane of the planar surface 12. As the conical surface 13 rolls, it engages points 42 thereon with the rounded heads 37 of the punchs 36. As is seen in FIG. 1, the point 42 is displaced a slight vertical distance from the surface 12.

The mechanical advantage of press 10 can be appreciated when considering the relationship between input torque Ti to the output force Fn of punch 36. If θ is the angle of the plane of tangency between cone surface 13 and punch head 37 with respect to plane 12, then the mechanical advantage Ma=tanθ and Ti=Fn/Ma×r where r (shown with respect to punch head 36) equals the distance from point 17 to punch head 37. As θ approaches 90°, the mechanical advantage approaches infinity for a frictionless system.

Figure 3:
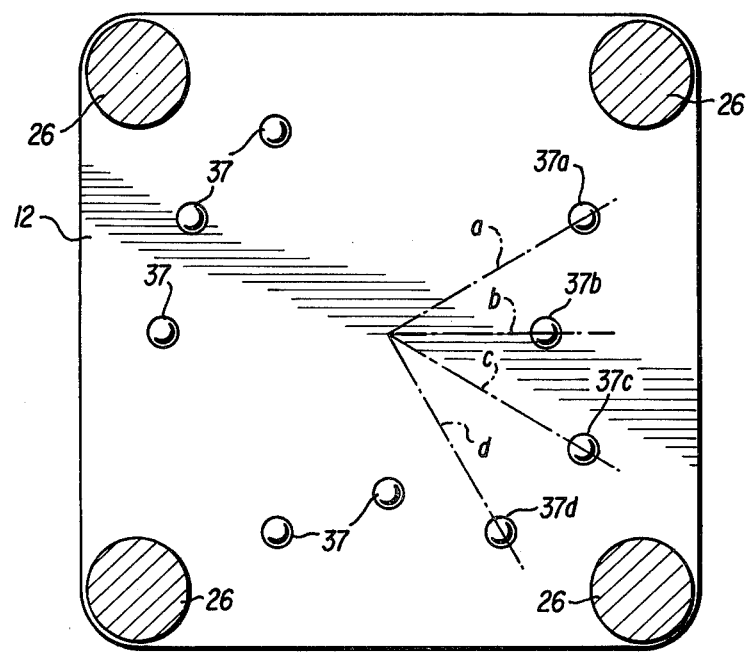
FIG. 3 is a top view showing a distribution of rivet punches in a press configured in accordance with the features of FIGS. 1 and 2.

Referring now to FIG. 3, a plurality of rounded punch heads 37 are shown exposed through the planar surface 12. As the conical surface 13 rolls around the planar surface 12, it establishes progressive line contact. Accordingly, the punch 37a is depressed along contact line "a", the punch 37b is depressed along contact line "b", the punch 37c is depressed along contact line "c", the punch 37n is depressed along contact line "n", and so forth. Since the punches 37 are depressed one at a time, less force per impulse is necessary from the press than if all of the punches are punched simultaneously. A relatively rapid rotation of the cone 11 can, therefore, accomplish the same result as a single stroke of an impacting tool without having to apply in one operation the cumulative force necessary to drive all of the rivets.

The foregoing embodiments and examples are merely illustrative of the invention which is limited only by the following claims.

What is claimed is:

1. A press for operating a plurality of spaced punches, the press comprising:
   a first axis;
   a first surface intersected by the first axis; wherein all lines in the first surface which are formed by an imaginary plane parallel with and intersecting the first axis form equal angles with the first axis;
   a conical member having a conical surface in engagement with the first surface along a line of contact;
   mounting means for rotatably mounting the conical member for rotation about a second axis, oblique with respect to the first axis, and intersecting the first axis at a point of intersection coincident with the first surface;
   means for rotating the mounting means about the first axis in a first direction, wherein the conical surface revolves in the opposite direction around the point of intersection as the conical surface rotates about the second axis, so that the conical surface rolls over the first surface to generate progressive line contact therewith without sliding with respect thereto to create a pressing force between the conical surface and first surface;
   a plurality of spaced apart punch stations in the first surface;
   a punch in each station; and
   means for normally holding the punches projected from the planar surface toward the conical surface, wherein the conical surface engages each punch individually as the conical surface rolls on the first surface to there depress the punches individually.

2. The press of claim 1 wherein the punch is used to drive a rivet.

3. The press of claim 2 wherein the first surface is a planar surface.

4. The press of claim 1 wherein the first surface is a planar surface.

* * * * *